United States Patent Office 2,941,991
Patented June 21, 1960

2,941,991
METAL-CONTAINING POLYAZO DYESTUFFS

Hans-Rudolf Byland, Riehen, near Basel, Switzerland, assignor, by mesne assignments, to Saul & Co., Newark, N.J., as nominee of Fidelity Union Trust Company, executive trustee under Sandoz Trust No Drawing. Filed Oct. 7, 1955, Ser. No. 539,257

Claims priority, application Switzerland Oct. 12, 1954

6 Claims. (Cl. 260—145)

The present application is a continuation-in-part application to my co-pending application Ser. No. 491,202, filed on February 28, 1955 (now U.S. Patent No. 2,803,-624), and relates to new metal, especially copper- and nickel-containing polyazo dyestuffs.

The co-pending application Ser. No. 491,202 is concerned with the embodiments of metal-containing, especially copper- and nickel-containing polyazo dyestuffs which, in the metal-free state, correspond to the formula

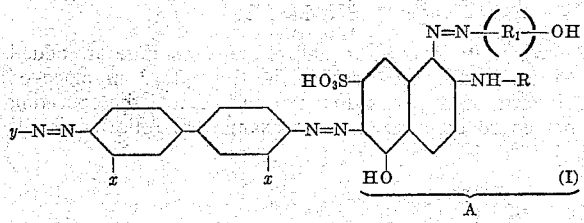

wherein $x$ stands for —OH, —OCH$_3$, —OC$_2$H$_5$, or —COOH, R stands for hydrogen or a radical of the aliphatic, alicyclic, araliphatic or aromatic series, R$_1$ stands for a mono- or binuclear radical of the benzene series, $y$ stands for the radical of a hydroxynaphthalene compound and is linked to the respective —N=N— group in ortho-position to the hydroxy group of said hydroxynaphthalene compound, radicals of the composition A being included, and wherein —OH adjacent to R$_1$ is located in ortho-position to the respective —N=N— group.

It has now been found that polyazo dyestuffs of the general Formula I which carry a carboxylic acid group adjacent to or in place of the OH group located on the radical R$_1$ in ortho-position to the respective —N=N— group, can also be converted into valuable metal complex compounds. Moreover the symbol $x$, in the new metalliferous polyazo dyestuffs, may represent a

—OCH$_2$.COOH group.

The new metalliferous polyazo dyestuffs correspond, in the metal free state, to the general formula

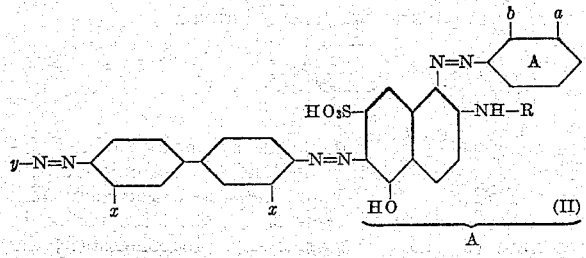

wherein R stands for hydrogen or a radical of the aliphatic, alicyclic, araliphatic or aromatic series, $x$ stands for —OH, —OCH$_3$, —OC$_2$H$_5$, —COOH or

—OCH$_2$.COOH $y$ stands for the radical of an hydroxynaphthalene compound and is linked to the respective —N=N— group in ortho-position to the hydroxy group of said hydroxynaphthalene compound, radicals of the composition A being included, $a$ stands for hydrogen or —COOH, $b$ stands for —COOH when $a$ is hydrogen, and for —OH, when $a$ is —COOH, and wherein the nucleus A may bear further substituents commonly used in azo dyestuffs.

The process of preparation of the new metalliferous polyazo dyestuffs consists in treating polyazo dyestuffs which correspond to the general Formula II, wherein R, $x$, $y$, $a$, $b$ and A have the significances recited in the foregoing paragraph, with metal-yielding, preferably copper- or nickel-yielding agents.

The metallization of the polyazo dyestuffs defined in the foregoing paragraph is carried out preferably with copper- or nickel-yielding agents, e.g. with copper formate, copper acetate, copper sulfate, or with the corresponding nickel compounds. The metallizing operation may be effected in several different ways, for example by heating the dyestuffs with copper salts in a weakly acid to alkaline medium, if desired with pressure applied, and/or in the presence of ammonia and/or organic bases, or in aqueous solutions of alkaline salts of low-molecular aliphatic monocaroxylic acids. If the polyazo dyestuffs contain alkoxy groups capable of being metallized, the metallization must be conducted with simultaneous splitting of these groups.

The components required for the preparation of the polyazo dyestuffs must of course be selected in such a way that the metal complex compounds contain the requisite number of solubilizing groups to render them water-soluble, for example carboxylic acid, sulfonic acid, sulfonic acid amide and lower alkylsulfonyl groups. Metalliferous polyazo dyestuffs which are only poorly soluble in warm water, often possess particularly good affinity for cellulosic fibres. These dyestuffs can be dyed with facility at temperatures above 100° and under pressure.

Of the substituents capable of being metallized the most important are the OH, OCH$_3$ and COOH groups. In the case of the OCH$_2$.COOH group the entire CH$_2$.COOH radical is split off in the de-alkylating metallization according to the present invention, so that the use of polyazo dyestuffs containing such groups often proves uneconomical. The new metalliferous polyazo dyestuffs are characterized by good compatability with salt and by the bright, deep navy blue shades of their dyeings on cotton and fibres of regenerated cellulose. The dyeings are dischargeable and possess very good light fastness and good to very good fastness to washing and water. Dyeings aftertreated with polyalkylene polyamine preparations containing copper, if desired in complex combination, have a particularly high standard of fastness. In addition the new dyestuffs reserve acetate rayon, and are also suitable for use in textile printing.

The invention is illustrated by the following examples. All parts and percentages are by weight; temperatures are given in degrees centigrade.

EXAMPLE 1

107.8 parts of the trisazo dyestuff obtained by coupling 1 mol of tetrazotized 4.4'-diamino-3.3'-dimethoxy-1.1'-diphenyl with 1 mol of 1-hydroxynaphthalene-3.8-disulfonic acid and 1 mol of 1-(2'-carboxyl-4'-nitro)-phenylazo-2-phenylamino-5-hydroxynaphthalene-7-sulfonic acid are suspended with 100 parts of diethanolamine, 15 parts of sodium carbonate and 50 parts of ammonia 25% in 2000 parts of water. The suspension is heated to 90°, at which point the trisazo dyestuff enters into partial solution. A solution of 76 parts of crystallized copper sulfate and 200 parts of ammonia 25% is added dropwise to the mass at 90° in the course of 30 minutes. The mass is boiled for 24 hours at the reflux, during which time the copper complex compound, upon formation, enters into complete solution. The solution is subsequently allowed to cool; the cupriferous trisazo dyestuff is precipitated by an addition of 160 parts of sodium chloride, and is then filtered off and dried. It is a dark powder which dissolves in water with a deep blue colouration, and dyes cotton and fibres of regenerated cellulose in navy blue shades which have remarkable fastness properties.

A very similar dyestuff is obtained when 1-hydroxynaphthalene-3.6-disulfonic acid is employed in place of 1-hydroxynaphthalene-3.8-disulfonic acid for the production of the starting product The new copper-containing trisazo dyestuffs correspond to the formulae

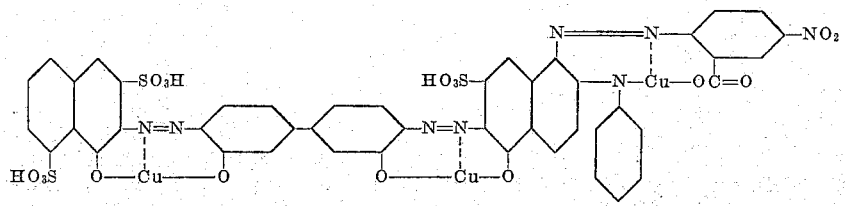

and

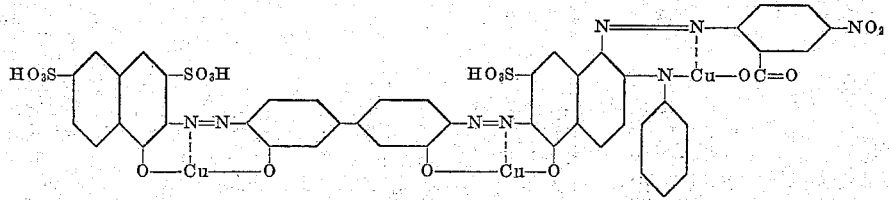

EXAMPLE 2

107.8 parts of the trisazo dyestuff used as starting product in Example 1, paragraph 1, are dissolved with 100 parts of pyridine, 15 parts of sodium carbonate and 50 parts of ammonia 25% in 2000 parts of water. To this solution is added in the course of 30 minutes a solution of 79 parts of crystallized nickel sulfate ($NiSO_4.6H_2O$) and 400 parts of ammonia 25%; the whole is then boiled at the reflux for 24 hours. The solution is subsequently cooled, the nickel complex compound of the trisazo dyestuff thus formed precipitated by an addition of 300 parts of sodium chloride, filtered off and dried. The nickeliferous trisazo dyestuff is a dark powder which dissolves in water to give deep blue-coloured solutions. It dyes cotton and fibres of regenerated cellulose in navy blue shades which have outstanding fastness properties.

The new nickel-containing trisazo dyestuff corresponds to the formula

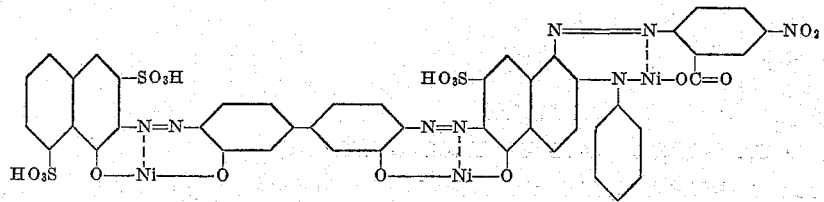

EXAMPLE 3

105 parts of the trisazo dyestuff obtained by coupling 1 mol of tetrazotized 4.4'-diamino-3.3'-dihydroxy-1.1'-diphenyl with 1 mol of 1-hydroxynaphthalene-3.8-disulfonic acid and 1 mol of 1-(2'-carboxy-4'-nitro)-phenylazo-2-phenylamino-5-hydroxynaphthalene-7-sulfonic acid are suspended in 400 parts of molten sodium acetate containing water of crystallization. 80 parts of crystallized copper sulfate are added to the suspension, and the mass is heated for 24 hours at the reflux under constant agitation. It is subsequently diluted with 2000 parts of water; the precipitated copper complex compound of the trisazo dyestuff is filtered off and dried. The cupriferous trisazo dyestuff displays the same properties as the identical copper complex compound described in Example 1.

EXAMPLE 4

When 79 parts of crystallized nickel sulfate are added to the suspension described in Example 3 in place of 80 parts of crystallized copper sulfate, and the operating procedure described in that example is followed in all other particulars, a nickeliferous trisazo dyestuff is obtained which has the same properties as the identical nickel complex compound described in Example 2.

The table which follows enumerates further metalliferous polyazo dyestuffs which in their non-metallized form correspond to the general formula

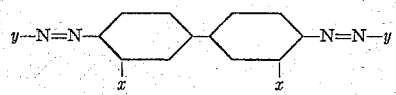

In column (2) of the table the significance of $x$ is indicated. The monoazo compound (II) forming the base of one of the radicals $y$ and the second azo component forming the base of the other $y$ radical are named in columns (3) and (4) respectively. In column (5) the heavy metal contained in the metal complex compound is indicated, and in column (6) the shades of the dyeings obtained with the metalliferous polyazo dyestuffs on cellulosic fibres are noted.

Table

| (1) | (2) | (3) | (4) | (5) | (6) |
|---|---|---|---|---|---|
| 5 | OCH₃ | 2-aminobenzene-1-carboxylic acid (acid) →2-phenylamino-5-hydroxynaphthalene-7-sulfonic acid. | 1-hydroxynaphthalene-3.6-disulfonic acid. | Cu | blue. |
| 6 | OCH₃ | ___do___ | 1-hydroxynaphthalene-3.8-disulfonic acid. | Cu | Do. |
| 7 | OCH₃ | 2-amino-1-carboxybenzene-4-sulfonic acid methylamide (acid)→2-phenylamino-5-hydroxynaphthalene-7-sulfonic acid. | 1-hydroxynaphthalene-3.6-disulfonic acid. | Cu | Do. |
| 8 | OC₂H₅ | 2-amino-1-carboxybenzene-4-sulfonic acid -(3'-methoxy)-propylamide (acid)→2-(3'-chloro)-phenylamino-5-hydroxynaphthalene-7-sulfonic acid. | 1-hydroxynaphthalene-3.8-disulfonic acid. | Cu | Do. |
| 9 | OCH₃ | 2-amino-1-carboxybenzene-4-sulfonic acid (acid)→2-(4'-methyl)-phenylamino-5-hydroxynaphthalene-7-sulfonic acid. | 2-hydroxynaphthalene-6-sulfonic acid. | Cu | Do. |
| 10 | OC₂H₅ | ___do___ | 1-hydroxynaphthalene-4-sulfonic acid. | Cu | Do. |
| 11 | OCH₃ | 2-amino-1-carboxybenzene-4-sulfonic acid (acid)→2-(4'-methoxy)-phenylamino-5-hydroxynaphthalene-7-sulfonic acid. | 2-hydroxynaphthalene-4-sulfonic acid. | Cu | Do. |
| 12 | OCH₃ | 2-amino-5-nitrobenzene-1-carboxylic acid (acid)→2-phenylamino-5-hydroxynaphthalene-7-sulfonic acid. | 1-hydroxynaphthalene-4-sulfonic acid. | Cu | Do. |
| 13 | OH | 2-amino-5-nitrobenzene-1-carboxylic acid (acid)→2-phenylamino-5-hydroxynaphthalene-7.4'-disulfonic acid. | 2-amino-5-nitrobenzene-1-carboxylic acid (acid)→2-phenylamino-5-hydroxynaphthalene-7.4'-disulfonic acid. | Ni | Do. |
| 14 | COOH | 2-amino-1-carboxybenzene-5-sulfonic acid (acid)→2-phenylamino-5-hydroxynaphthalene-7-sulfonic acid. | 2-amino-1-carboxybenzene-5-sulfonic acid (acid)→2-phenylamino-5-hydroxynaphthalene-7-sulfonic acid. | Cu | Do. |
| 15 | OCH₃ | 2-amino-5-nitrobenzene-1-carboxylic acid (acid)→2-phenylamino-5-hydroxynaphthalene-7-sulfonic acid. | 2-amino-5-nitrobenzene-1-carboxylic acid (acid)→2-phenylamino-5-hydroxynaphthalene-7.4'-disulfonic acid. | Cu | Do. |
| 16 | OCH₃ | ___do___ | 2-hydroxynaphthalene-6-sulfonic acid. | Cu | Do. |
| 17 | OCH₃ | 2-amino-5-methylsulfonylbenzene-1-carboxylic acid (acid)→2-phenylamino-5-hydroxynaphthalene-7-sulfonic acid. | 1-hydroxynaphthalene-3.8-disulfonic acid. | Cu | Do. |
| 18 | OCH₃ | ___do___ | 1-hydroxynaphthalene-3.6-disulfonic acid. | Cu | Do. |
| 19 | OCH₃ | 2-amino-5-nitrobenzene-1-carboxylic acid (acid)←2-(3'-sulfamide)-phenylamino-5-hydroxynaphthalene-7-sulfonic acid. | 1-hydroxynaphthalene-3.6-disulfonic acid. | Cu | Do. |
| 20 | OCH₂.COOH | ___do___ | ___do___ | Cu | Do. |
| 21 | OCH₃ | 2-amino-1-hydroxy-6-carboxybenzene-4-sulfonic acid (acid)→2-phenylamino-5-hydroxynaphthalene-7-sulfonic acid. | 1-hydroxynaphthalene-3.8-disulfonic acid. | Cu | Do. |
| 22 | OCH₃ | 2-amino-1-hydroxy-4-nitrobenzene-6-carboxylic acid (acid)→2-phenylamino-5-hydroxynaphthalene-7-sulfonic acid. | 1-hydroxynaphthalene-3.6-disulfonic acid. | Cu | Do. |
| 23 | OCH₃ | 2-amino-5-nitrobenzene-1-carboxylic acid (acid)→2-amino-5-hydroxynaphthalene-7-sulfonic acid. | ___do___ | Cu | Do. |
| 24 | OCH₃ | 2-aminobenzene-1-carboxylic acid (acid)→2-methylamino-5-hydroxynaphthalene-7-sulfonic acid. | 1-hydroxynaphthalene-3.8-disulfonic acid. | Cu | Do. |
| 25 | OCH₃ | 2-amino-5-nitrobenzene-1-carboxylic acid (acid)→2-benzylamino-5-hydroxynaphthalene-7-sulfonic acid. | 1-hydroxynaphthalene-3.6.8-trisulfonic acid. | Cu | Do. |
| 26 | OCH₃ | 2-amino-5-nitrobenzene-1-carboxylic acid (acid)→2-cyclohexylamino-5-hydroxynaphthalene-7-sulfonic acid. | ___do___ | Cu | Do. |
| 27 | OCH₃ | 2-amino-1-hydroxy-6-carboxybenzene-4-sulfonic acid amide (acid)→2-phenylamino-5-hydroxynaphthalene-7-sulfonic acid. | 1-hydroxynaphthalene-3.6-disulfonic acid. | Cu | Do. |
| 28 | OCH³ | 2-amino-1-carboxybenzene-4-sulfonic acid-ethylamide (acid)→2-phenylamino-5-hydroxynaphthalene-7-sulfonic acid. | ___do___ | Cu | Do. |
| 29 | OCH³ | 2-amino-1-carboxybenzene-4-sulfonic acid-(2'-hydroxy)-ethylamide (acid)→2-phenylamino-5-hydroxynaphthalene-7-sulfonic acid. | ___do___ | Cu | Do. |
| 30 | OCH³ | 2-amino-1-carboxybenzene-4-sulfonic acid-(3'-methoxy)-propylamide (acid)→2-(4'-chloro)-phenylamino-5-hydroxynaphthalene-7-sulfonic acid. | 1-hydroxynaphthalene-3.8-disulfonic acid. | Cu | Do. |
| 31 | OCH³ | 2-amino-5-chlorobenzene-1-carboxylic acid (acid)→2-(4'-sulfomethylamido)-phenylamino-5-hydroxynaphthalene-7-sulfonic acid. | ___do___ | Cu | Do. |

The following are formulae of representative products of the foregoing examples.

EXAMPLE 6

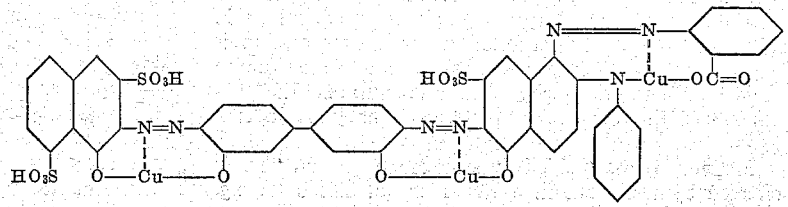

EXAMPLE 10

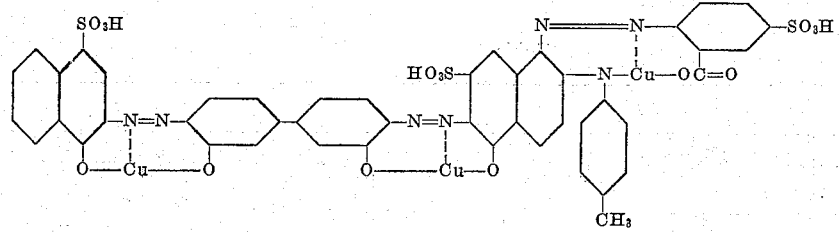

EXAMPLE 17

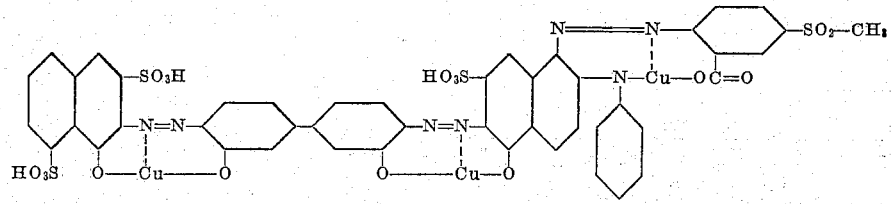

EXAMPLE 19

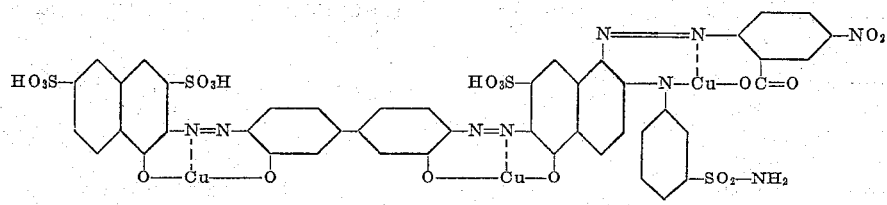

It is evident from the foregoing examples that the number of atoms of metal in the molecule of the dyestuffs is equal to the number of azo (—N=N—) groups.

EXAMPLE 32

100 parts of cotton, wetted out in hot water, are entered into a dyebath at 40° containing a solution of 1.5 parts of the dyestuff produced according to Example 1, paragraph 1, and 10 parts of Glauber's salt in 3000 parts of soft water. The bath is heated to 100° in the course of about 30 minutes during which time 20 parts of Glauber's salt are added in portions. The dyeing process is continued for 15 minutes at 100°, after which a further 10 parts of Glauber's salt are added. The bath is then allowed to cool to about 50° in 15–20 minutes, when the dyed cotton is removed, rinsed and dried.

Fibres of regenerated cellulose are dyed in the same way.

EXAMPLE 33

15 parts of the dyestuff described in Example 1, paragraph 2, are boiled with 100 parts of urea and 45 parts of triethanolamine in 360 parts of water. The solution is then given 400 parts of tragacanth 6%, 20 parts of sodium phosphate, 40 parts of an anionic wetting agent and 10 parts of an antifoaming agent. A fabric of viscose rayon is printed with this printing paste; the printed fabric is dried, steamed for 45–60 minutes, and rinsed. After a 15 minute aftertreatment at 60° with 1 g./l. of a polyalkylene polyamine preparation containing copper salt, the printed fabric is again rinsed and dried.

EXAMPLE 34

22.5 parts of the cupriferous trisazo dyestuff obtained according to Example 1, paragraph 1, are dissolved in 1000 parts of boiling distilled water. The solution is allowed to cool and applied in the cold state from a padder on a cotton fabric. With a take-up of 80% (calculated on the weight of the material), a navy blue dyeing is obtained.

Fixation of the padded dyestuff on the cotton fibre is effected by treatment in a steam or hot salt bath, e.g. with 20 grams of common salt per litre. The material is subsequently rinsed and dried.

What is claimed is:

1. A water-soluble substantive metal-containing polyazo dyestuff wherein the metal is selected from the class consisting of copper and nickel, and which, in the metal-free state, corresponds to the formula

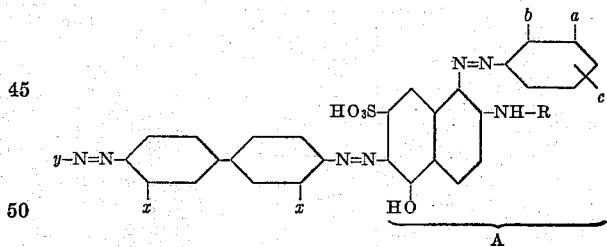

wherein R stands for a member selected from the group consisting of hydrogen and aliphatic, alicyclic, araliphatic and mononuclear aromatic radicals, $x$ stands for a member selected from the group consisting of —OH, —OCH$_3$, —OC$_2$H$_5$, —COOH and —OCH$_2$.COOH, $y$ stands for the radical of an hydroxy-naphthalene compound linked to the adjacent —N=N— group in ortho-position to the hydroxy group and is selected from the group consisting of a radical of an unsubstituted hydroxy-naphthalenemonosulfonic acid, a radical of an unsubstituted hydroxynaphthalenedisulfonic acid, a radical of an unsubstituted hydroxynaphthalenetrisulfonic acid, and a radical of composition A, $a$ stands for a member selected from the group consisting of hydrogen and —COOH, $b$ stands for —COOH when $a$ is hydrogen, and stands for —OH when $a$ is —COOH, $c$ stands for a member selected from the group consisting of hydrogen, chlorine, nitro, —SO$_3$H, —SO$_2$NH$_2$, —SO$_2$.NH.lower alkyl, —SO$_2$.NH.-lower hydroxyalkyl, —SO$^2$.NH.lower alkoxyalkyl and —SO$_2$.lower alkyl, and wherein the total number of sulfonic acid groups contained in the polyazo dyestuff molecule amounts to at least 3 and at most 4, and the number of atoms of metal in said molecule is the same as the number of —N=N— groups.

2. The water-soluble substantive cupriferous polyazo dyestuff which corresponds to the formula

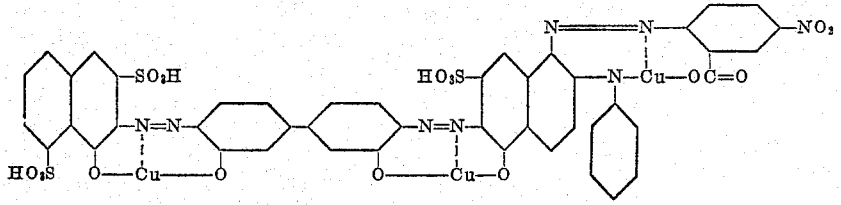

3. The water-soluble substantive cupriferous polyazo dyestuff which corresponds to the formula

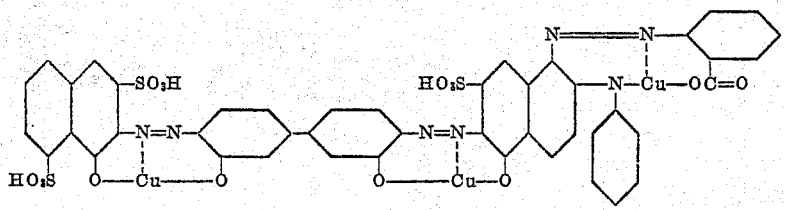

4. The water-soluble substantive cupriferous polyazo dyestff which corresponds to the formula

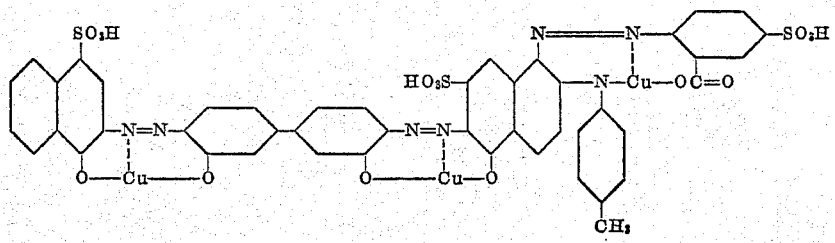

5. The water-soluble substantive cupriferous polyazo dyestuff which corresponds to the formula

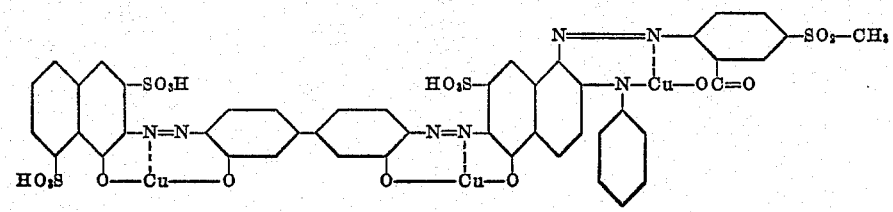

6. The water-soluble substantive cupriferous polyazo dyestuff which corresponds to the formula

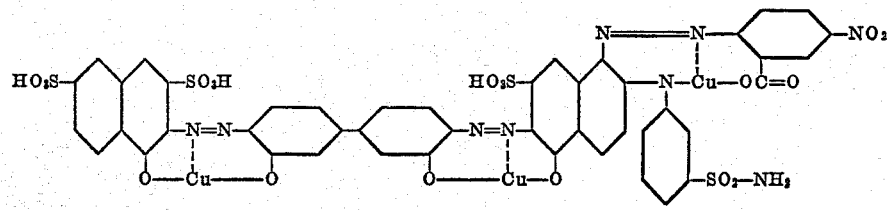

References Cited in the file of this patent

UNITED STATES PATENTS

| | | |
|---|---|---|
| 2,417,306 | Krebser et al. | Mar. 11, 1947 |
| 2,507,754 | Bossard et al. | May 16, 1950 |
| 2,638,468 | Wehrli | May 12, 1953 |
| 2,644,812 | Ruckstuhl et al. | July 7, 1953 |
| 2,842,539 | Byland | July 8, 1958 |

OTHER REFERENCES

Venkataraman, "Synthetic Dyes," vol. II, pages 1290 and 1350.